United States Patent
Shinohara

(10) Patent No.: US 11,276,280 B2
(45) Date of Patent: Mar. 15, 2022

(54) IN-VEHICLE APPARATUS, DATA PROCESSING METHOD, AND RECORDING MEDIUM

(71) Applicant: ALPINE ELECTRONICS, INC., Tokyo (JP)

(72) Inventor: Osamu Shinohara, Fukushima (JP)

(73) Assignee: ALPINE ELECTRONICS, INC., Tokyo (JP)

( * ) Notice: Subject to any disclaimer, the term of this patent is extended or adjusted under 35 U.S.C. 154(b) by 0 days.

(21) Appl. No.: 16/747,889

(22) Filed: Jan. 21, 2020

(65) Prior Publication Data
US 2020/0234546 A1   Jul. 23, 2020

(30) Foreign Application Priority Data
Jan. 22, 2019   (JP) .............................. JP2019-008647

(51) Int. Cl.
*G08B 3/10*   (2006.01)
*H04B 1/7163*   (2011.01)

(52) U.S. Cl.
CPC ........... *G08B 3/10* (2013.01); *H04B 1/71635* (2013.01)

(58) Field of Classification Search
CPC .... G08B 3/10; H04B 1/71635; H04B 14/026; G10L 19/167; G10L 19/00; G10L 19/04; G10L 19/16; G10L 19/002; H03M 5/08; H04L 25/49; H04L 25/4902; H04L 25/4904; H04S 1/007
See application file for complete search history.

(56) References Cited

U.S. PATENT DOCUMENTS

| | | | | |
|---|---|---|---|---|
| 4,727,331 A | * | 2/1988 | Hegeler | B06B 1/0276 327/175 |
| 2004/0217808 A1 | * | 11/2004 | Kim | H03F 3/185 330/10 |
| 2017/0264384 A1 | * | 9/2017 | Ise | H04H 20/86 |
| 2018/0335503 A1 | * | 11/2018 | Seifert | G01S 5/16 |
| 2020/0003865 A1 | * | 1/2020 | Andersen | H04L 27/18 |

FOREIGN PATENT DOCUMENTS

| | | | |
|---|---|---|---|
| DE | 102013200053 A1 * | 8/2013 | ............... H03K 7/08 |
| JP | 2003-324361 | 11/2003 | |
| JP | 2004-282441 | 10/2004 | |
| JP | 2007-326382 | 12/2007 | |
| JP | 2013-090187 | 5/2013 | |
| JP | 2017-163322 | 9/2017 | |
| KR | 2018-0095250 | 8/2018 | |

OTHER PUBLICATIONS

European Extended Search Report for 20152800.7 dated Jun. 23, 2020.

* cited by examiner

*Primary Examiner* — Hai Phan
*Assistant Examiner* — Anthony D Afrifa-Kyei
(74) *Attorney, Agent, or Firm* — IPUSA, PLLC

(57) ABSTRACT

An in-vehicle apparatus includes a first pulse generator configured to generate a first pulse in accordance with predetermined equipment before a data stream transmitted from the equipment is received; a second pulse generator configured to generate a second pulse based on the received data stream; an output device configured to output a warning sound based on the first pulse or the second pulse; and a switching device configured to output the first pulse to the output device before the data stream is received, and output the second pulse to the output device as of when the first pulse and the second pulse coincide.

7 Claims, 7 Drawing Sheets

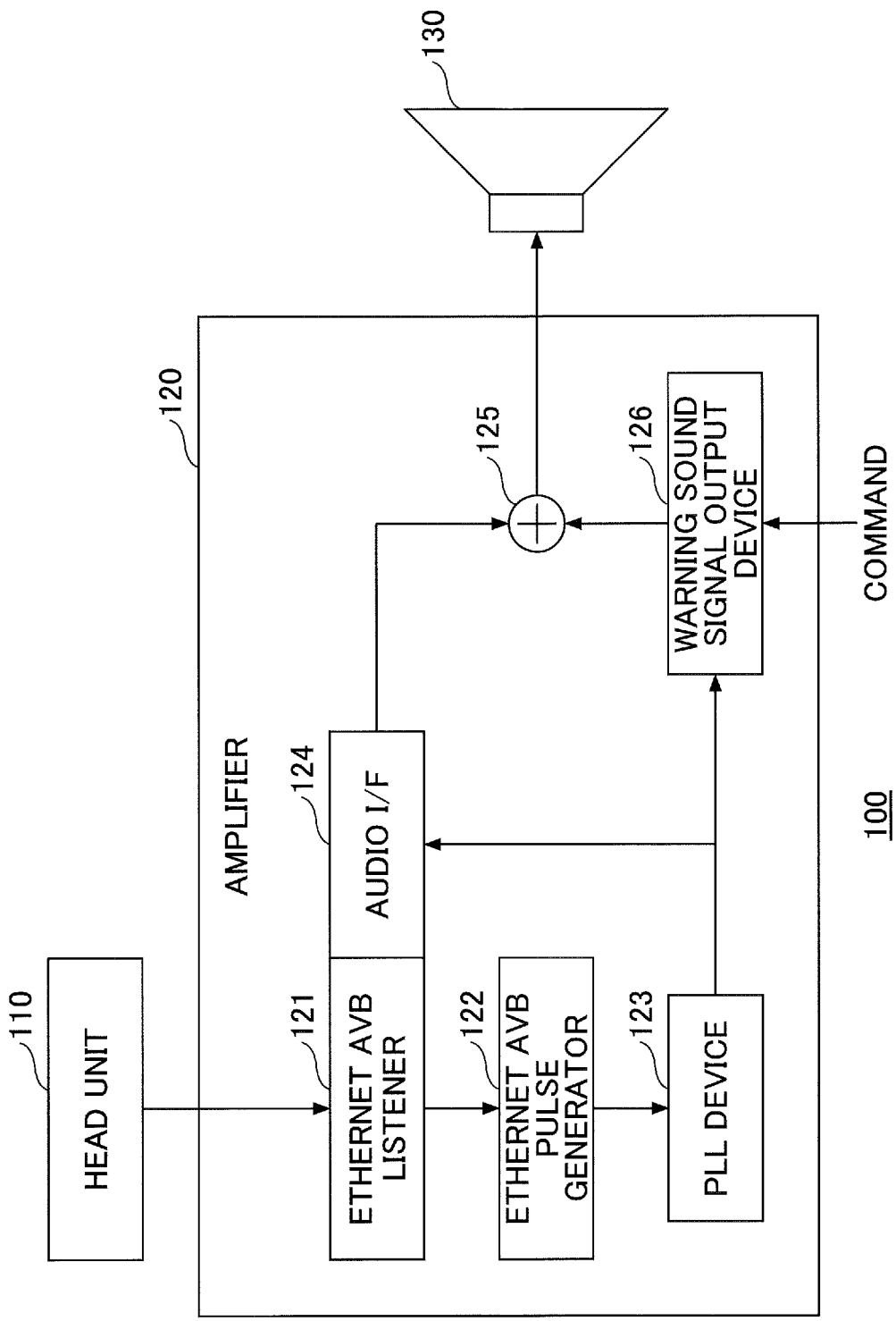

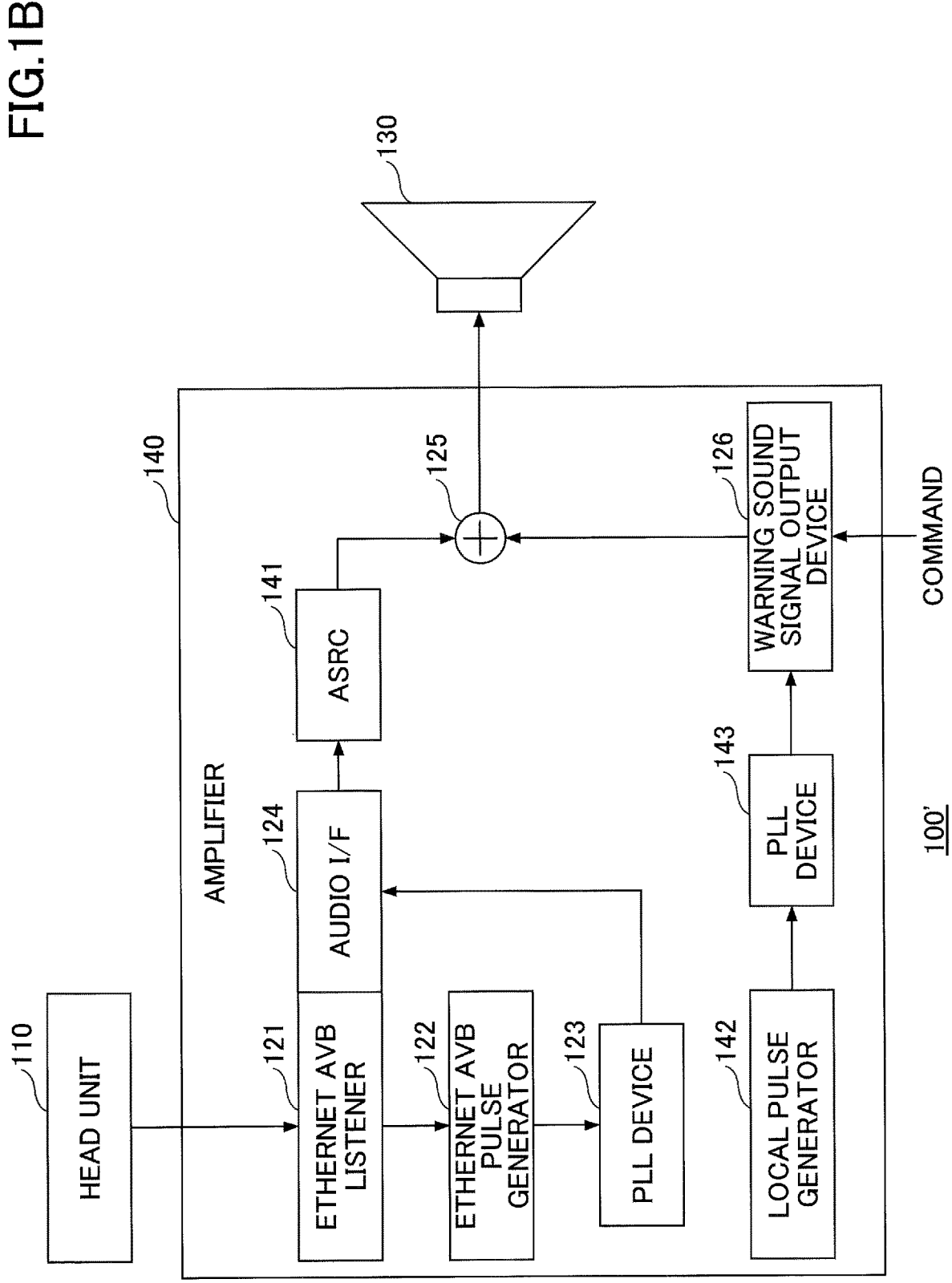

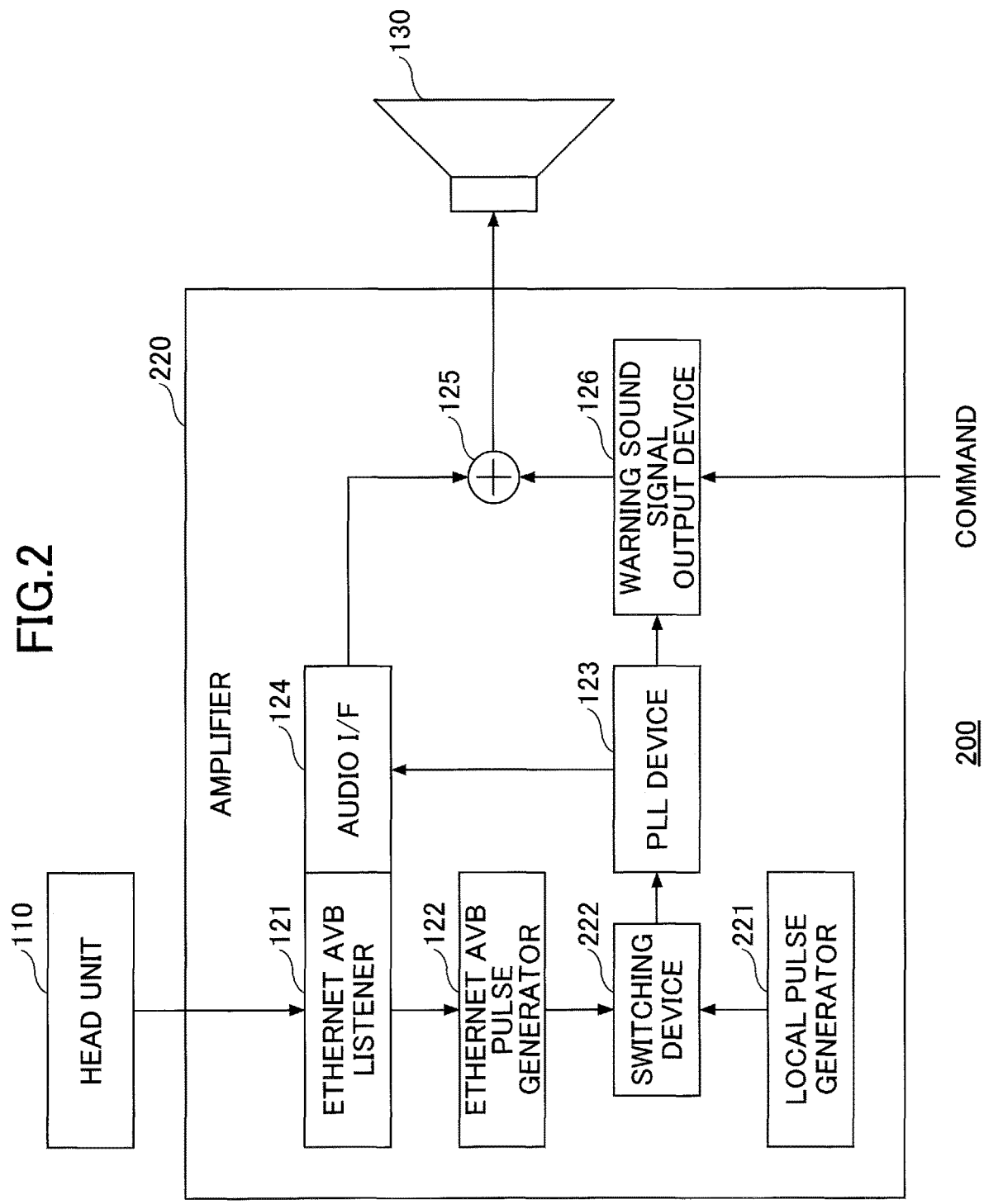

IN-VEHICLE APPARATUS, DATA PROCESSING METHOD, AND RECORDING MEDIUM

CROSS-REFERENCE TO RELATED APPLICATIONS

This application is based on and claims priority to Japanese Patent Application No. 2019-008647, filed on Jan. 22, 2019, the entire contents of which are incorporated herein by reference.

BACKGROUND OF THE INVENTION

1. Field of the Invention

The disclosures herein relate to an in-vehicle apparatus, a data processing method, and a recording medium.

2. Description of the Related Art

Conventionally, as an in-vehicle apparatus connected to a network via Ethernet (registered trademark), an amplifier functioning as an Ethernet Audio Video Bridging (AVB) listener is known. The amplifier outputs audio data after receiving an Ethernet AVB stream from a head unit and starting to generate a pulse for audio data playback.

In the above-described amplifier, various processes, including Ethernet link-up, gPTP (generalized precision time protocol) time synchronization, and acquisition of definition information on a start time and an end time of an Ethernet AVB stream, are performed at startup of the amplifier. Therefore, it takes a certain period of time before a pulse for audio data playback starts to be generated and audio data is output.

Thus, if the amplifier is configured to output a warning sound in addition to audio data, and is required to output the warning sound at the time of startup, the amplifier would not be able to immediately output the warning sound.

RELATED-ART DOCUMENTS

Patent Documents

[Patent Document 1] Japanese Laid-Open Patent Publication No. 2004-282441
[Patent Document 2] Japanese Laid-Open Patent Publication No. 2013-90187
[Patent Document 3] Japanese Laid-Open Patent Publication No. 2017-163322

SUMMARY OF THE INVENTION

It is a general object of the present invention to shorten the time required before starting to output a warning sound at startup of an in-vehicle apparatus.

According to an embodiment of the present invention, an in-vehicle apparatus includes a first pulse generator configured to generate a first pulse in accordance with predetermined equipment before a data stream transmitted from the equipment is received; a second pulse generator configured to generate a second pulse based on the received data stream; an output device configured to output a warning sound based on the first pulse or the second pulse; and a switching device configured to output the first pulse to the output device before the data stream is received, and output the second pulse to the output device as of when the first pulse and the second pulse coincide.

According to an embodiment of the present invention, a data processing method includes generating a first pulse in accordance with predetermined equipment before receiving a data stream transmitted from the equipment; generating a second pulse based on the received data stream; outputting, by an output device, a warning sound based on the first pulse or the second pulse; and outputting the first pulse to the output device before receiving the data stream, and outputting the second pulse to the output device as of when the first pulse and the second pulse coincide.

According to an embodiment of the present invention, a non-transitory recording medium storing a data processing program for causing a computer to execute a process includes generating a first pulse in accordance with predetermined equipment before receiving a data stream transmitted from the equipment; generating a second pulse based on the received data stream; outputting, by an output device, a warning sound based on the first pulse or the second pulse; and outputting the first pulse to the output device before receiving the data stream, and outputting the second pulse to the output device as of when the first pulse and the second pulse coincide.

BRIEF DESCRIPTION OF THE DRAWINGS

Other objects and further features of the present invention will be apparent from the following detailed description when read in conjunction with the accompanying drawings, in which:

FIG. 1A and FIG. 1B are diagrams illustrating configurations of in-vehicle apparatuses according to comparative examples;

FIG. 2 is a diagram illustrating an example of a configuration of an in-vehicle apparatus according to a first embodiment;

DESCRIPTION OF THE EMBODIMENTS

Figure 3:
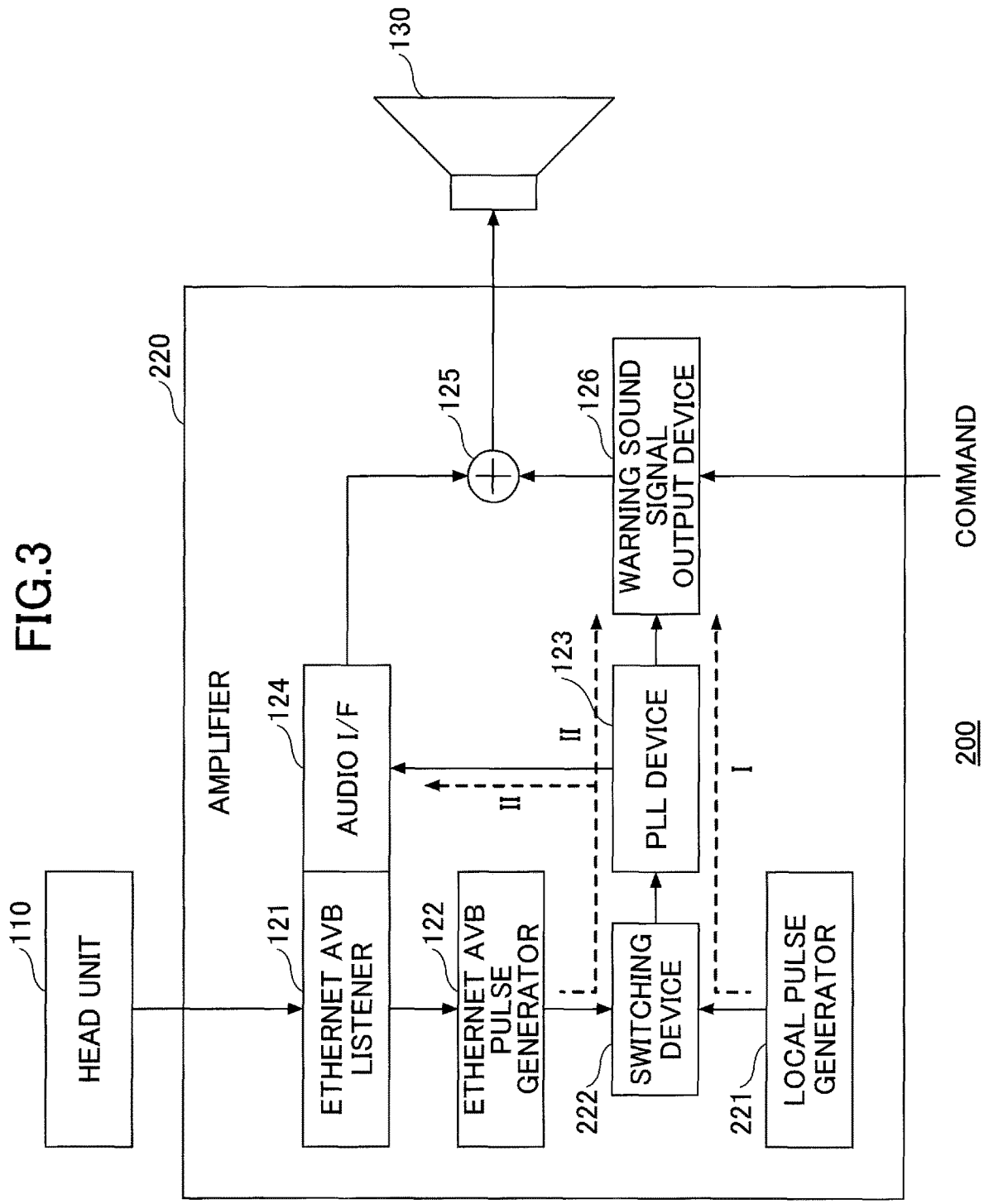
FIG. 3 is a diagram illustrating pulse flows in the in-vehicle apparatus according to the first embodiment.

According to an embodiment of the present invention, it is possible to shorten the time required before starting to output a warning sound at startup of an in-vehicle apparatus.

In the following, embodiments of the present invention will be described with reference to the accompanying drawings. In the specification and drawings, elements having substantially the same functions or configurations are denoted by the same numerals, and a duplicate description thereof will not be provided.

First Embodiment

<Configuration of in-Vehicle Apparatus>
A configuration of an in-vehicle apparatus (amplifier) according to a first embodiment will be described. In order to clarify the differences, configurations of in-vehicle apparatuses (amplifiers) according to comparative examples will be described first, and the configuration of the in-vehicle apparatus (amplifier) according to the first embodiment will be described next.

(1) Configurations of the in-Vehicle Apparatuses (Amplifiers) According to the Comparative Examples FIG. 1A and FIG. 1B are diagrams illustrating the configurations of the in-vehicle apparatuses according to the comparative examples. An in-vehicle system 100 illustrated in FIG. 1A includes an amplifier 120 configured to output audio data after receiving an Ethernet AVB stream (an example of a data stream) and starting to generate a pulse for audio data playback at the time of startup. First, the in-vehicle system 100 illustrated in FIG. 1A will be described.

As illustrated in FIG. 1A, the in-vehicle system 100 includes a head unit 110, the amplifier 120, and a speaker 130.

The head unit 110 is predetermined equipment that serves as an Ethernet AVB talker and transmits an Ethernet AVB stream including audio data.

The amplifier 120 includes an Ethernet AVB listener 121, an Ethernet AVB pulse generator 122, a phase-locked loop (PLL) device 123, an audio interface (I/F) 124, a combiner 125, and a warning sound signal output device 126.

The Ethernet AVB listener 121 performs Ethernet link-up and gPTP time synchronization processes, and receives the Ethernet AVB stream from the head unit 110. Further, the Ethernet AVB listener 121 performs a process for acquiring definition information on a start time and an end time of the Ethernet AVB stream. The Ethernet AVB listener 121 instructs the Ethernet AVB pulse generator 122 to start to generate a pulse, and indicates audio data included in the Ethernet AVB stream to the audio I/F 124.

The Ethernet AVB pulse generator 122 is an example of a second pulse generator. In response to receiving an instruction from the Ethernet AVB listener 121, the Ethernet AVB pulse generator 122 starts to generate an Ethernet AVB pulse (second pulse) based on the Ethernet AVB stream.

The PLL device 123 controls the audio I/F 124 and the warning sound signal output device 126 such that the audio I/F 124 and the warning sound signal output device 126 output audio data and a warning sound in synchronization with the Ethernet AVB pulse generated by the Ethernet AVB pulse generator 122.

The audio I/F 124 outputs audio data, indicated by the Ethernet AVB listener 121, based on the Ethernet AVB pulse.

The warning sound signal output device 126 is an example of an output device, and outputs the warning sound based on the Ethernet AVB pulse if a command is received from an external device.

The combiner 125 combines the audio data output from the audio I/F 124 with the warning sound output from the warning sound signal output device 126, and outputs the combined audio data and the warning sound to the speaker 130. Then, the speaker 130 outputs the combined audio data and the warning sound.

As described above, in the in-vehicle system 100, the warning sound signal output device 126 of the amplifier 120 is configured to output the warning sound based on the Ethernet AVB pulse. For this reason, if the command is received from the external device at startup of the amplifier 120, the warning sound would be unable to be output for a period of time before the Ethernet AVB pulse starts to be generated.

An in-vehicle system 100' illustrated in FIG. 1B includes an amplifier 140 configured to output a warning sound based on a local pulse, instead of outputting the warning sound based on an Ethernet AVB pulse.

Unlike the in-vehicle system 100, in the in-vehicle system 100' illustrated in FIG. 1B, the amplifier 140 includes an asynchronous sample rate converter (ASRC) 141, a local pulse generator 142, and a PLL device 143.

The local pulse generator 142 generates a local pulse (first pulse) for output of a warning sound.

The PLL device 143 controls the warning sound signal output device 126 such that the warning sound signal output device 126 outputs the warning sound in synchronization with the local pulse generated by the local pulse generator 142.

The ASRC 141 performs a process in which audio data output from the audio I/F 124 based on the Ethernet AVB pulse is synchronized with the warning sound output from the warning sound signal output device 126.

As described above, in the in-vehicle system 100' illustrated in FIG. 1B, the warning sound signal output device 126 of the amplifier 140 is configured to output the warning sound based on the local pulse. Therefore, it is possible to avoid a situation in which the warning sound is unable to be output for a period of time before the Ethernet AVB pulse starts to be generated at startup of the amplifier 140, as in the case of the in-vehicle system 100 illustrated in FIG. 1A.

However, in the in-vehicle system 100' illustrated in FIG. 1B, the ASRC 141 is required to be additionally included in the amplifier 140, thus resulting in an increase in costs. Further, in the in-vehicle system 100' illustrated in FIG. 1B, binary data is unable to be output.

(2) Configuration of the in-Vehicle Apparatus (Amplifier) According to the First Embodiment FIG. 2 is a diagram illustrating an example of the configuration of the in-vehicle apparatus according to the first embodiment. An in-vehicle system 200 illustrated in FIG. 2 differs from the in-vehicle systems 100 and 100' illustrated in FIG. 1A and FIG. 1B, in that an amplifier 220 includes a local pulse generator 221, and a switching device 222.

The local pulse generator 221 is an example of a first pulse generator and generates a local pulse in accordance with the head unit 110. The local pulse generator 221 generates a local pulse during startup of the amplifier 220.

The switching device 222 outputs the local pulse generated by the local pulse generator 221 to the PLL device 123 during the startup of the amplifier 220. Further, the switching device 222 switches pulses to be output to the PLL device 123, at a timing when the local pulse generated by the local pulse generator 221 coincides with an Ethernet AVB pulse generated by the Ethernet AVB pulse generator 122. Specifically, the switching device 222 switches from the local pulse to the Ethernet AVB pulse, and outputs the Ethernet AVB pulse to the PLL device 123.

After the switching device 222 switches the pulses, audio data and a warning sound are output based on the Ethernet AVB pulse.

Accordingly, in the in-vehicle apparatus (amplifier 220) according to the first embodiment, during the startup of the amplifier 220, the warning sound signal output device 126 outputs the warning sound based on the local pulse instead of the Ethernet AVB pulse. Therefore, it is possible to avoid a situation in which the warning sound is unable to be output for a period of time before the Ethernet AVB pulse starts to be generated at the startup of the amplifier 120, as in the in-vehicle system 100 illustrated in FIG. 1A. Namely, it is possible to shorten the time before starting to output the warning sound at the startup of the amplifier 220.

Further, in the in-vehicle apparatus (amplifier 220) according to the first embodiment, as of when the Ethernet AVB pulse starts to be generated and the generated Ethernet AVB pulse coincides with the local pulse, audio data and the warning sound are output based on the Ethernet AVB pulse. Therefore, the ASRC 141 is not required to be additionally included in the amplifier, thereby avoiding an increase in costs. In addition, in the in-vehicle apparatus (amplifier 220) according to the first embodiment, binary data can also be output.

<Functions of Switching Device>

Next, functions of the switching device 222 will be described in further detail. FIG. 3 is a diagram illustrating pulse flows in the in-vehicle apparatus according to the first embodiment. In FIG. 3, a thick dashed arrow I indicates a pulse flow at startup of the amplifier 220. By starting the amplifier 220, the local pulse generator 221 starts to generate a local pulse, and the switching device 222 outputs the local pulse generated by the local pulse generator 221 to the PLL device 123.

Therefore, even if the Ethernet AVB pulse generator 122 has not started to generate an Ethernet AVB pulse, the warning sound signal output device 126 can output the warning sound based on the local pulse if a command is received from an external device.

Further, in FIG. 3, thick dashed arrows II indicate pulse flows after an Ethernet AVB stream is transmitted from the head unit 110 and the Ethernet AVB pulse is started to be generated by the Ethernet AVB pulse generator 122.

At a timing when the Ethernet AVB pulse and the local pulse coincide, the switching device 222 switches from the local pulse to the Ethernet AVB pulse generated by the Ethernet AVB pulse generator 122, and outputs the Ethernet AVB pulse to the PLL device 123.

Then, the audio I/F 124 outputs audio data based on the Ethernet AVB pulse. Further, if the command is received from the external device, the warning sound signal output device 126 outputs the warning sound based on the Ethernet AVB pulse.

<Flow of Audio Data Process>

Figure 4:
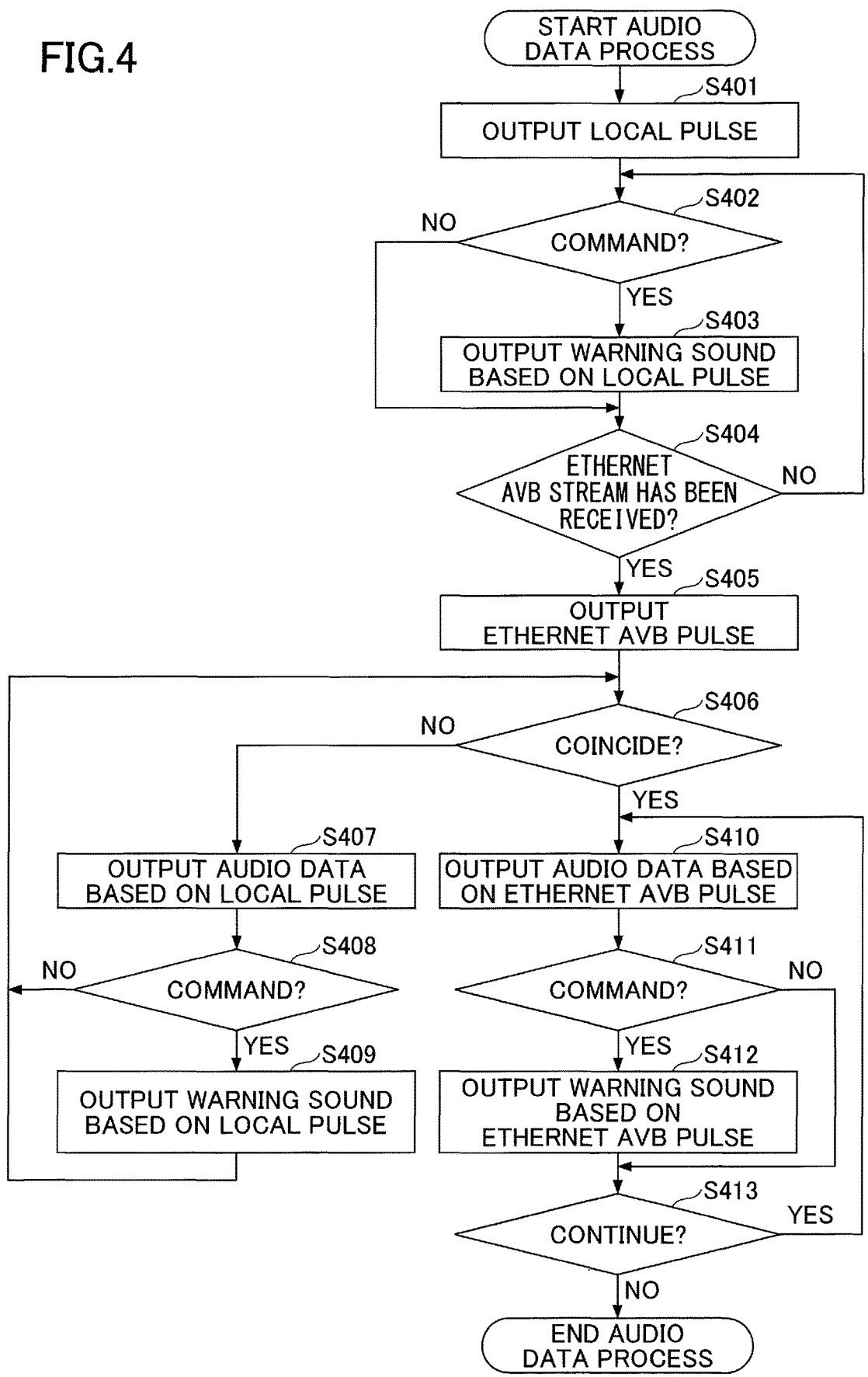
FIG. 4 is a flowchart illustrating a flow of an audio data process performed by the in-vehicle apparatus according to the first embodiment.

Next, a flow of an audio data process performed by the in-vehicle apparatus (amplifier 220) will be described. FIG. 4 is a flowchart illustrating the flow of the audio data process performed by the in-vehicle apparatus according to the first embodiment. By starting the amplifier 220, the audio data process illustrated in FIG. 4 starts.

In step S401, the local pulse generator 221 starts to generate a local pulse.

In step S402, the warning sound signal output device 126 determines whether a command has been received from an external device. In step S402, when the warning sound signal output device 126 determines that the command has not been received (no in step S402), the process proceeds to step S404.

Conversely, in step S402, when the warning sound signal output device 126 determines that the command has been received (yes in step S402), the process proceeds to step S403. In step S403, the warning sound signal output device 126 outputs a warning sound based on the local pulse.

In step S404, the Ethernet AVB listener 121 determines whether an Ethernet AVB stream has been received from the head unit 110. In step S404, when the Ethernet AVB listener determines that the Ethernet AVB stream has not been received (no in step S404), the process returns to step S402. Note that Ethernet link-up and gPTP time synchronization processes are assumed to be completed at this point.

Conversely, in step S404, when the Ethernet AVB listener determines that the Ethernet AVB stream has been received (yes in step S404), a process for acquiring definition information on a start time and an end time of the Ethernet AVB stream is performed. Then, the process proceeds to step S405.

In step S405, the Ethernet AVB pulse generator 122 starts to generate an Ethernet AVB pulse.

In step S406, the switching device 222 determines whether the local pulse generated by the local pulse generator 221 coincides with the Ethernet AVB pulse generated by the Ethernet AVB pulse generator 122.

In step S406, when it is determined that the local pulse and the Ethernet AVB pulse do not coincide (no in step S406), the process proceeds to step S407. In step S407, the audio I/F 124 outputs audio data based on the local pulse.

In step S408, the warning sound signal output device 126 determines whether the command has been received from the external device. In step S408, when it is determined that the command has not been received (no in step S408), the process returns to step S406.

Conversely, in step S408, when it is determined that the command has been received (yes in step S408), the process proceeds to step S409. In step S409, the warning sound signal output device 126 outputs the warning sound based on the local pulse.

In step S406, when it is determined that the local pulse and the Ethernet AVB pulse coincide (yes in step S406), the process proceeds to step S410. In step S410, the switching device 222 switches from the local pulse to the Ethernet AVB pulse, and outputs the Ethernet AVB pulse to the PLL device 123. Therefore, the audio I/F 124 outputs audio data based on the Ethernet AVB pulse. Note that, after the switching device 222 switches to the Ethernet AVB pulse, the local pulse generator 221 stops the generation of the local pulse.

In step S411, the warning sound signal output device 126 determines whether the command has been received from the external device. In step S411, when it is determined that the command has not been received (no in step S411), the process proceeds to step S413.

Conversely, in step S411, when it is determined that the command has been received (yes in step S411), the process proceeds to step S412. In step S412, the warning sound signal output device 126 outputs the warning sound based on the Ethernet AVB pulse.

In step S413, the Ethernet AVB listener 121 determines whether to continue the audio data process. In step S413, when the Ethernet AVB listener 121 determines to continue the audio data process (yes in step S413), the process returns to step S410.

Conversely, in step S413, when the Ethernet AVB listener 121 determines not to continue the audio data process (no in step S413), the audio data process ends.

<Summary>

As is clear from the above description, the in-vehicle apparatus (amplifier 220) according to the first embodiment includes:

a local pulse generator that generates a local pulse in accordance with a head unit at startup of the in-vehicle apparatus (amplifier 220), before an Ethernet AVB stream transmitted from the head unit is received;

an Ethernet AVB pulse generator that generates an Ethernet AVB pulse based on the received Ethernet AVB stream;

a warning sound signal output device that outputs a warning sound based on the local pulse or the Ethernet AVB pulse; and a switching device that outputs the local pulse to the warning sound signal output device before the Ethernet AVB stream is received, and outputs the Ethernet AVB pulse as of when the local pulse and the Ethernet AVB pulse coincide.

Accordingly, in the in-vehicle apparatus according to the first embodiment, it is possible to output the warning sound based on the local pulse at startup, thereby avoiding a situation in which the warning sound is unable to be output for a period of time before the Ethernet AVB pulse starts to be generated. Namely, at startup of the in-vehicle apparatus, it is possible to shorten the time required before starting to output the warning sound.

Second Embodiment

In the above-described first embodiment, audio data and the warning sound are output based on the Ethernet AVB pulse as of when the switching device switches to the Ethernet AVB pulse. However, as of when the switch device switches to the Ethernet AVB pulse, the transmission of the Ethernet AVB stream may be interrupted.

In such a case, the Ethernet AVB pulse generator stops the generation of the Ethernet AVB pulse. Thus, if the command is received from the external device in the meantime, the warning sound signal output device 126 would not be able to output the warning sound.

In light of the above, in a second embodiment, if the transmission of the Ethernet AVB stream is interrupted, a local pulse generator 522 resumes the generation of the local pulse, and the warning sound signal output device outputs the warning sound based on the local pulse. In the following, differences between the first embodiment and the second embodiment will be mainly described.

<Configuration of in-Vehicle Apparatus (Amplifier) According to Second Embodiment>

Figure 5:
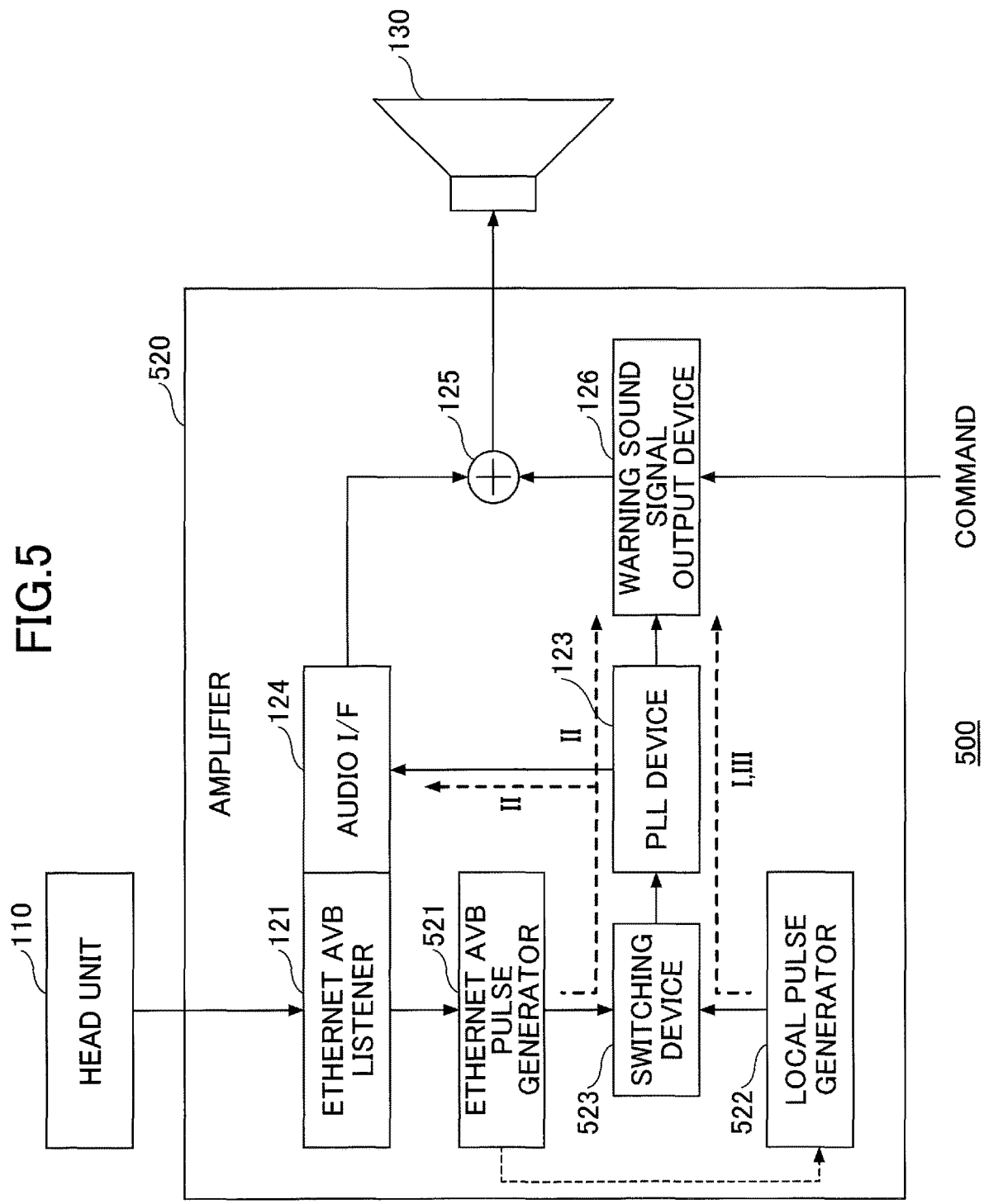
FIG. 5 is a diagram illustrating an example of a configuration of an in-vehicle apparatus and pulse flows according to a second embodiment.

First, a configuration of an in-vehicle apparatus (amplifier) according to the second embodiment will be described. FIG. 5 is a diagram illustrating an example of the configuration of the in-vehicle apparatus and pulse flows according to the second embodiment. In an in-vehicle system 500 illustrated in FIG. 5, functions of an Ethernet AVB pulse generator 521, functions of the local pulse generator 522, and functions of a switching device 523 included in an amplifier 520 are different from those of the in-vehicle system illustrated in FIG. 2.

In addition to the functions of the Ethernet AVB pulse generator 122 described with reference to FIG. 1A, the Ethernet AVB pulse generator 521 has a function to monitor whether the transmission of the Ethernet AVB stream from the head unit 110 is interrupted.

Further, the Ethernet AVB pulse generator 521 also has a function to send a notification to the local pulse generator 522 and the switching device 523 when it is determined that the transmission of the Ethernet AVB stream is interrupted.

In addition to the functions of the local pulse generator 221 described with reference to FIG. 2, the local pulse generator 522 has a function to resume the generation of the local pulse as of when the local pulse coincides with the Ethernet AVB pulse based on the notification from the Ethernet AVB pulse generator 521.

In addition to the functions of the switching device 222 described with reference to FIG. 2, the switching device 523 has a function to switch from the Ethernet AVB pulse to the local pulse based on the notification from the Ethernet AVB pulse generator 521, and outputs the local pulse to the PLL device 123. Therefore, if the command is received from the external device, the warning sound signal output device 126 outputs the warning sound based on the local pulse, started to be generated again by the local pulse generator 522 (see a thick dashed arrow III).

<Flow of Audio Data Process>

Figure 6:
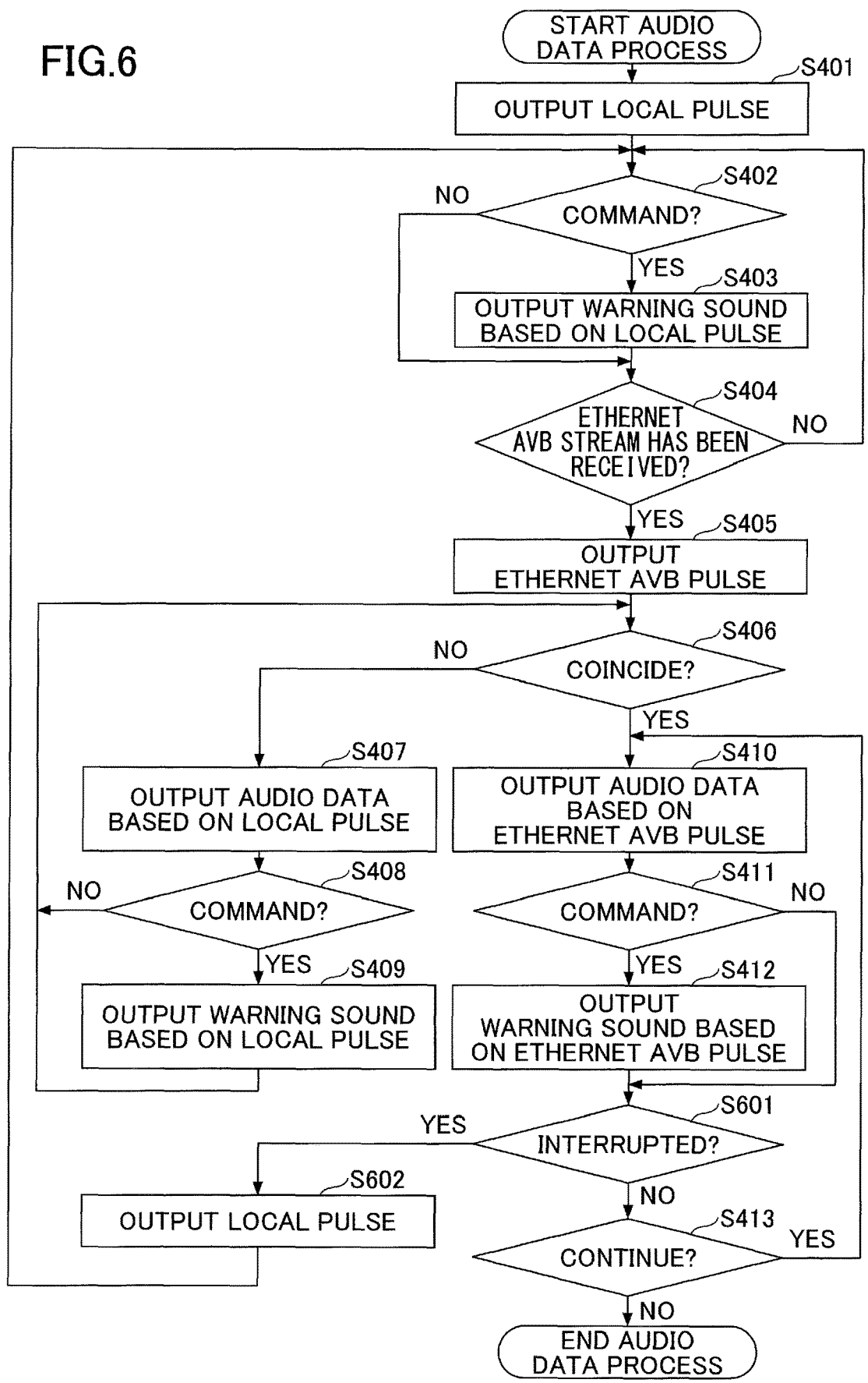
FIG. 6 is a flowchart illustrating a flow of an audio data process performed by the in-vehicle apparatus according to the second embodiment.

Next, a flow of an audio data process performed by the in-vehicle apparatus (amplifier 520) according to the second embodiment will be described. FIG. 6 is a flowchart illustrating the flow of the audio data process performed by the in-vehicle apparatus according to the second embodiment. The differences between the audio data process illustrated in FIG. 6 and the audio data process illustrated in FIG. 4 are step S601 and step S602.

In step S601, the Ethernet AVB pulse generator 521 determines whether the transmission of the Ethernet AVB stream from the head unit 110 is interrupted. In step S601, when the transmission of the Ethernet AVB stream is determined not to be interrupted (no in step S601), the process proceeds to step S413.

Conversely, when the transmission of the Ethernet AVB stream is determined to be interrupted (yes in step S601), the process proceeds to step S602.

In step S602, the local pulse generator 522 resumes the generation of the local pulse as of when the local pulse coincides with the Ethernet AVB pulse, and the process returns to step S402.

<Summary>

As is clear from the above description, in the in-vehicle apparatus (amplifier 520) according to the second embodiment, the Ethernet AVB pulse generator 521 monitors whether the transmission of the Ethernet AVB stream is interrupted after the switching device switches to the Ethernet AVB stream, and the local pulse generator resumes the generation of the local pulse when the transmission of the Ethernet AVB stream is determined to be interrupted, and the warning sound signal output device outputs the warning sound based on the local pulse.

Accordingly, in the in-vehicle apparatus according to the second embodiment, it is possible to output the warning sound even when the transmission of the Ethernet AVB stream is interrupted.

Other Embodiments

In the first embodiment and the second embodiment described above, the functions of the amplifier 220 and the amplifier 520 are implemented by hardware. However, some of the functions of the amplifier 220 and the amplifier 520 may be implemented by software. Specifically, some of the functions of the amplifier 220 and the amplifier 520 may be implemented by causing a computer to execute a data processing program. Herein, the computer is configured by a central processing unit (CPU), a read-only memory (ROM), and a random-access memory (RAM).

Further, in the in-vehicle system 200 and the in-vehicle system 500 according to the first embodiment and the second embodiment described above, each of the amplifier 220 and the amplifier 520 is illustrated as an individual in-vehicle apparatus, but may be provided as a part of another in-vehicle apparatus.

Further, in the first embodiment and the second embodiment described above, examples employing an Ethernet AVB protocol have been described, but, needless to say, any other protocol may be employed.

Although the present invention has been described with reference to embodiments, the present invention is not limited to the configurations as described in the embodiments, and the configurations as described in the embodiments may be combined with other elements. It should be noted that combination of the elements of the above-described embodiments may be changed without departing from the scope of the present invention, and may be determined in accordance with applications as appropriate.

What is claimed is:

1. An in-vehicle apparatus comprising:
a first pulse generator configured to have an amplifier and generate a first pulse in accordance with predetermined equipment before a data stream transmitted from the equipment is received;
a second pulse generator configured to generate a second pulse based on the received data stream;
an output device configured to output a warning sound based on the first pulse or the second pulse; and
a switching device configured to output the first pulse to the output device during start-up of the amplifier, before the data stream is received and before the second pulse generator begins generating the second pulse, and the switching device is further configured to switch from the first pulse to the second pulse and output the second pulse to the output device as of when the first pulse and the second pulse coincide,
wherein the output device is configured to output the warning sound based on the first pulse upon determining that the first pulse and the second pulse do not coincide.

2. The in-vehicle apparatus according to claim 1, wherein the second pulse generator further determines whether the data stream transmitted from the equipment is interrupted.

3. The in-vehicle apparatus according to claim 2, wherein the first pulse generator resumes generation of the first pulse in a case where the second pulse generator determines that the data stream transmitted from the equipment is interrupted, and
the switching device switches to the first pulse and outputs the first pulse in the case where the second pulse generator determines that the data stream transmitted from the equipment is interrupted.

4. A data processing method comprising:
generating a first pulse in accordance with predetermined equipment before receiving a data stream transmitted from the equipment;
generating a second pulse based on the received data stream;
outputting, by an output device, a warning sound based on the first pulse or the second pulse;
outputting the first pulse to the output device during start-up of an amplifier, before receiving the data stream and before beginning generating the second pulse, and
switching from the first pulse to the second pulse and outputting the second pulse to the output device as of when the first pulse and the second pulse coincide,
wherein the method further comprises outputting, by the output device, the warning sound based on the first pulse upon determining that the first pulse and the second pulse do not coincide.

5. A non-transitory recording medium storing a data processing program for causing a computer to execute a process comprising:
generating a first pulse in accordance with predetermined equipment before receiving a data stream transmitted from the equipment,
generating a second pulse based on the received data stream;
outputting, by an output device, a warning sound based on the first pulse or the second pulse;
outputting the first pulse to the output device during start-up of an amplifier before receiving the data stream and before beginning generating the second pulse, and
switching from the first pulse to the second pulse and outputting the second pulse to the output device as of when the first pulse and the second pulse coincide, and
wherein the process further comprises outputting, by the output device, the warning sound based on the first pulse upon determining that the first pulse and the second pulse do not coincide.

6. The in-vehicle apparatus according to claim 1, wherein the first pulse generator is configured to generate the first pulse for outputting an warning sound upon receiving an instruction to generate the warning sound from an outside apparatus provided outside the in-vehicle apparatus.

7. The in-vehicle apparatus according to claim 3, wherein the second pulse generator is configured to monitor the data stream after the switching device switches from the first pulse to the second pulse to determine whether the data stream transmitted from the equipment is interrupted.

* * * * *